US012735094B2

(12) United States Patent
Ezati et al.

(10) Patent No.: US 12,735,094 B2
(45) Date of Patent: Sep. 15, 2026

(54) DETECTING AND DISTINGUISHING BETWEEN STUCK AND FAILED RACK IN STEERING SYSTEMS FOR VEHICLES

(71) Applicant: GM GLOBAL TECHNOLOGY OPERATIONS LLC, Detroit, MI (US)

(72) Inventors: Mahdokht Ezati, Pickering (CA); Amin Habibnejad Korayem, Markham (CA); SeyedAlireza Kasaiezadeh Mahabadi, Novi, MI (US); Seyedeh Asal Nahidi, North York (CA); Douglas James Spry, Clarkston, MI (US); Hojjat Izadi, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 18/928,896

(22) Filed: Oct. 28, 2024

(65) Prior Publication Data

US 2026/0116463 A1 Apr. 30, 2026

(51) Int. Cl.
*B62D 5/04* (2006.01)
*B62D 5/00* (2006.01)

(52) U.S. Cl.
CPC ......... *B62D 5/0487* (2013.01); *B62D 5/0484* (2013.01); *B62D 5/006* (2013.01)

(58) Field of Classification Search
CPC ..... B62D 5/0487; B62D 5/006; B62D 5/0484
See application file for complete search history.

(56) References Cited

U.S. PATENT DOCUMENTS

| | | | | |
|---|---|---|---|---|
| 11,753,068 | B2 * | 9/2023 | Kitazume | B62D 15/0245 180/446 |
| 2015/0360715 | A1 * | 12/2015 | Shimizu | B62D 5/0484 701/43 |
| 2018/0127025 | A1 * | 5/2018 | Wijffels | B62D 5/008 |
| 2019/0092377 | A1 * | 3/2019 | Shin | B62D 5/0481 |
| 2020/0070872 | A1 * | 3/2020 | Ushiro | B62D 5/04 |
| 2021/0245800 | A1 * | 8/2021 | Kitazume | B62D 5/0463 |
| 2021/0269086 | A1 | 9/2021 | Anraku et al. | |

(Continued)

FOREIGN PATENT DOCUMENTS

| | | | |
|---|---|---|---|
| DE | 102013114109 | A1 | 7/2014 |
| DE | 102015118882 | A1 | 5/2016 |

*Primary Examiner* — Long T Tran
(74) *Attorney, Agent, or Firm* — Ingrassia Fisher & Lorenz, LLP | IF&L

(57) ABSTRACT

In accordance with exemplary embodiments, methods and systems are provided that include a one or more steering sensors of a vehicle and processor. The one or more steering sensors are configured to obtain steering sensor data pertaining to a steering system of the vehicle, the steering system including a motor and a rack. The processor is coupled to the one or more steering sensors, and is configured to at least facilitate determining an estimated electric current of the motor based on the steering sensor data; comparing the estimated electric current with a predetermined electric current threshold; and determining a condition of the steering system of the vehicle, including whether movement of the vehicle is inhibited and whether the rack has a failure, based on whether the estimated electric current is greater than or equal to the predetermined electric current threshold.

14 Claims, 8 Drawing Sheets

(56) References Cited

U.S. PATENT DOCUMENTS

| | | | | |
|---|---|---|---|---|
| 2022/0315105 | A1* | 10/2022 | Kuragaki | B62D 15/025 |
| 2023/0068424 | A1* | 3/2023 | Sun | B62D 5/0469 |
| 2023/0100164 | A1* | 3/2023 | Sun | B62D 5/0484 701/41 |
| 2024/0092420 | A1* | 3/2024 | Wang | B62D 5/0412 |
| 2024/0140525 | A1* | 5/2024 | Maruyama | B62D 5/0469 |
| 2024/0253697 | A1* | 8/2024 | Ojima | B62D 5/0481 |
| 2024/0383525 | A1* | 11/2024 | Kodato | B62D 5/0463 |

* cited by examiner

DETECTING AND DISTINGUISHING BETWEEN STUCK AND FAILED RACK IN STEERING SYSTEMS FOR VEHICLES

INTRODUCTION

The technical field generally relates to steering systems for vehicles and, more specifically, to methods and systems for distinguishing between stuck and failed rack conditions for steering systems for vehicles.

Certain vehicles today include steer-by-wire steering systems, in which there is no physical connection between a steering wheel and road wheels of the vehicle. In certain situations, such a vehicle may encounter an issue in which movement of the vehicle is inhibited, and it may be difficult to determine the nature of the condition, such as when a rack of the steering system has a failure or when an object is causing the vehicle to be stuck.

Accordingly, it is desirable to provide improved methods and systems for determining conditions for steering systems of vehicles, including as to whether a vehicle stuck, or rack failure condition is present for a vehicle having a steer-by-wire system. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: obtaining, via one or more steering sensors of a vehicle, steering sensor data pertaining to a steering system of the vehicle, the steering system including a motor and a rack; determining, via a processor of the vehicle, an estimated electric current of the motor based on the steering sensor data; comparing, via the processor, the estimated electric current with a predetermined electric current threshold; and determining, via the processor, a condition of the steering system of the vehicle, including whether movement of the vehicle is inhibited and whether the rack has a failure, based on whether the estimated electric current is greater than or equal to the predetermined electric current threshold.

Also in an exemplary embodiment, the steering system includes a steer-by-wire steering system having a feedback motor coupled to a steering wheel of the vehicle and a road wheel actuator (RWA) motor coupled to a road wheel of the vehicle; and the estimated electric current pertains to the RWA motor that is coupled to the road wheel of the vehicle.

Also in an exemplary embodiment, the method further includes taking a vehicle control action, in accordance with instructions provided by the processor, based on the condition that is determined via the processor.

Also in an exemplary embodiment, the method further includes providing a notification for a driver of the vehicle based on the condition, including instructions for an action for the driver to take to remedy the condition, via a display screen of the vehicle in accordance with the instructions provided thereto via the processor.

Also in an exemplary embodiment, the method further includes obtaining, via one or more cameras of the vehicle, camera data as to one or more external objects that are in proximity to the vehicle; determining that the condition includes an operational condition in which the steering system is operating correctly, when the estimated electric current is less than the predetermined electric current threshold; determining that the condition includes a rack failure condition in which a mechanical failure is present for the rack, when both of the following conditions are satisfied: the estimated electric current is greater than or equal to the predetermined electric current threshold; and the camera data does not show any external objects that are deemed to be inhibiting movement of the vehicle; and determining that the condition includes a rack stuck condition in which the rack is deemed to be stuck by the one or more external objects, when both of the following conditions are satisfied: the estimated electric current is greater than or equal to the predetermined electric current threshold; and the camera shows an external object that is deemed to be inhibiting movement of the vehicle.

Also in an exemplary embodiment, the method further includes providing a service instruction for a driver of the vehicle, via instructions provide by the processor, to obtain repair of the steering system when the condition includes the rack failure condition; and providing a steering action instruction for the driver of the vehicle, via the instructions provide by the processor, when the condition includes the rack stuck condition.

Also in an exemplary embodiment, the determining of the estimated electric current of the motor is performed by the processor using an observer to estimate an angle of a road wheel actuator (RWA) motor and current by integrating a prediction model for the RWA motor and a measurement model for observations, along with use of a Kalman filter.

Also in an exemplary embodiment, the determining of the estimated electric current of the motor is performed by the processor also by modeling the motor as a direct current (DC) permanent magnet motor, and by modeling electrical properties of the motor as a series connection of a resistor, an inductor, and a voltage source that represents back-EMF produced by the motor, and further including a relationship between a hand wheel actuator (HWA) requested rack displacement and a resulting RWA road wheel angle.

Also in an exemplary embodiment, the determining of the estimated electric current of the motor is performed by the processor also by utilizing pinion angle sensor measurements and rack force estimations received from an actuator and determining the current based on the rack force using a mathematical model that represents an interaction between the rack and pinion, along with an electrical model that represents the interaction between motor torque and the current.

Also in an exemplary embodiment, the Kalman filter is utilized by the processor in estimating an angle of the motor along with the current of the motor utilizing a requested disk replacement ($d_r^{ag}$), a motor voltage ($V_m$), a pinion angle (P), and rack force ($F_r$), and utilizing multiple predictions of the current at different points in time and using a motion model as well as measurements of the current using an observation model, along with a time delay for the Kalman filter.

In another exemplary embodiment, a system is provided that includes one or more steering sensors of a vehicle and processor. The one or more steering sensors are configured to obtain steering sensor data pertaining to a steering system of the vehicle, the steering system including a motor and a rack. The processor is coupled to the one or more steering sensors, and is configured to at least facilitate determining an estimated electric current of the motor based on the steering sensor data; comparing the estimated electric current with a predetermined electric current threshold; and determining a condition of the steering system of the vehicle, including whether movement of the vehicle is inhibited and whether the rack has a failure, based on whether the estimated electric current is greater than or equal to the predetermined electric current threshold.

Also in an exemplary embodiment, the steering system includes a steer-by-wire steering system having a feedback motor coupled to a steering wheel of the vehicle and a road wheel actuator (RWA) motor coupled to a road wheel of the vehicle; and the estimated electric current pertains to the RWA motor that is coupled to the road wheel of the vehicle.

Also in an exemplary embodiment, the system further includes one or more cameras of the vehicle configured to obtain camera data as to one or more external objects that are in proximity to the vehicle; and the processor is coupled to the one or more cameras and is further configured to at least facilitate determining that the condition includes an operational condition in which the steering system is operating correctly, when the estimated electric current is less than the predetermined electric current threshold; determining that the condition includes a rack failure condition in which a mechanical failure is present for the rack, when both of the following conditions are satisfied: the estimated electric current is greater than or equal to the predetermined electric current threshold; and the camera data does not show any external objects that are deemed to be inhibiting movement of the vehicle; and determining that the condition includes a rack stuck condition in which the rack is deemed to be stuck by the one or more external objects, when both of the following conditions are satisfied: the estimated electric current is greater than or equal to the predetermined electric current threshold; and the camera shows an external object that is deemed to be inhibiting movement of the vehicle.

Also in an exemplary embodiment, the processor is further configured to at least facilitate providing a service instruction for a driver of the vehicle, via instructions provide by the processor, to obtain repair of the steering system when the condition includes the rack failure condition; and providing a steering action instruction for the driver of the vehicle, via the instructions provide by the processor, when the condition includes the rack stuck condition.

Also in an exemplary embodiment, the processor is further configured to determine the estimated electric current of the motor by using an observer to estimate a motor angle for a road wheel actuator (RWA) motor and current by integrating a prediction model for the RWA motor and a measurement model for observations, along with use of a Kalman filter; modeling the motor as a direct current (DC) permanent magnet motor, and by modeling electrical properties of the motor as a series connection of a resistor, an inductor, and a voltage source that represents back-EMF produced by the motor, and further including a relationship between a hand wheel actuator (HWA) requested rack displacement and a resulting RWA road wheel angle; and utilizing pinion angle sensor measurements and rack force estimations received from an actuator and determining the current based on the rack force using a mathematical model that represents an interaction between the rack and pinion, along with an electrical model that represents the interaction between motor torque and current.

Also in an exemplary embodiment, the processor is further configured to utilize the Kalman filter in estimating an angle of the motor along with the current of the motor utilizing a requested disk replacement ($d_r^{ag}$), a motor voltage ($V_m$), a pinion angle (P), and rack force ($F_r$), and utilizing multiple predictions of the current at different points in time and using a motion model as well as measurements of the current using an observation model, along with a time delay for the Kalman filter.

In another exemplary embodiment, a vehicle is provided that includers a steering system, one or more steering sensors, and a processor. The steering system includes a steer-by-wire steering system having a rack as well as a feedback motor coupled to a steering wheel of the vehicle and a road wheel actuator (RWA) motor coupled to a road wheel of the vehicle. The one or more steering sensors are configured to obtain steering sensor data pertaining to the steering system of the vehicle. The processor is coupled to the one or more steering sensors, and is configured to at least facilitate determining an estimated electric current of the RWA motor based on the steering sensor data; comparing the estimated electric current with a predetermined electric current threshold; and determining a condition of the steering system of the vehicle, including whether movement of the vehicle is inhibited and whether the rack has a failure, based on whether the estimated electric current is greater than or equal to the predetermined electric current threshold.

Also in an exemplary embodiment, the vehicle further includes one or more cameras of the vehicle configured to obtain camera data as to one or more external objects that are in proximity to the vehicle; wherein the processor is coupled to the one or more cameras and is further configured to at least facilitate determining that the condition includes an operational condition in which the steering system is operating correctly, when the estimated electric current is less than the predetermined electric current threshold; determining that the condition includes a rack failure condition in which a mechanical failure is present for the rack, when both of the following conditions are satisfied: the estimated electric current is greater than or equal to the predetermined electric current threshold; and the camera data does not show any external objects that are deemed to be inhibiting movement of the vehicle; and determining that the condition includes a rack stuck condition in which the rack is deemed to be stuck by the one or more external objects, when both of the following conditions are satisfied: the estimated electric current is greater than or equal to the predetermined electric current threshold; and the camera shows an external object that is deemed to be inhibiting movement of the vehicle.

Also in an exemplary embodiment, the processor is further configured to at least facilitate providing a service instruction for a driver of the vehicle, via instructions provide by the processor, to obtain repair of the steering system when the condition includes the rack failure condition; and providing a steering action instruction for the driver of the vehicle, via the instructions provide by the processor, when the condition includes the rack stuck condition.

Also in an exemplary embodiment, the processor is further configured to determine the estimated electric current of the motor by using an observer to estimate a motor angle for the RWA motor and current by integrating a prediction model for the RWA motor and a measurement model for observations, along with use of a Kalman filter; modeling the motor as a direct current (DC) permanent magnet motor, and by modeling electrical properties of the motor as a series connection of a resistor, an inductor, and a voltage source that represents back-EMF produced by the motor, and further including a relationship between a hand wheel actuator (HWA) requested rack displacement and a resulting RWA road wheel angle; utilizing pinion angle sensor measurements and rack force estimations received from an actuator and determining the current based on the rack force using a mathematical model that represents an interaction between the rack and pinion, along with an electrical model that represents the interaction between motor torque and current; and utilizing the Kalman filter in estimating an angle of the motor along with the current of the motor utilizing a requested disk replacement ($d_r^{ag}$), a motor voltage ($V_m$), a pinion angle (P), and rack force ($F_r$), and utilizing multiple predictions of the current at different points in time and using a motion model as well as measurements of the current using an observation model, along with a time delay for the Kalman filter.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
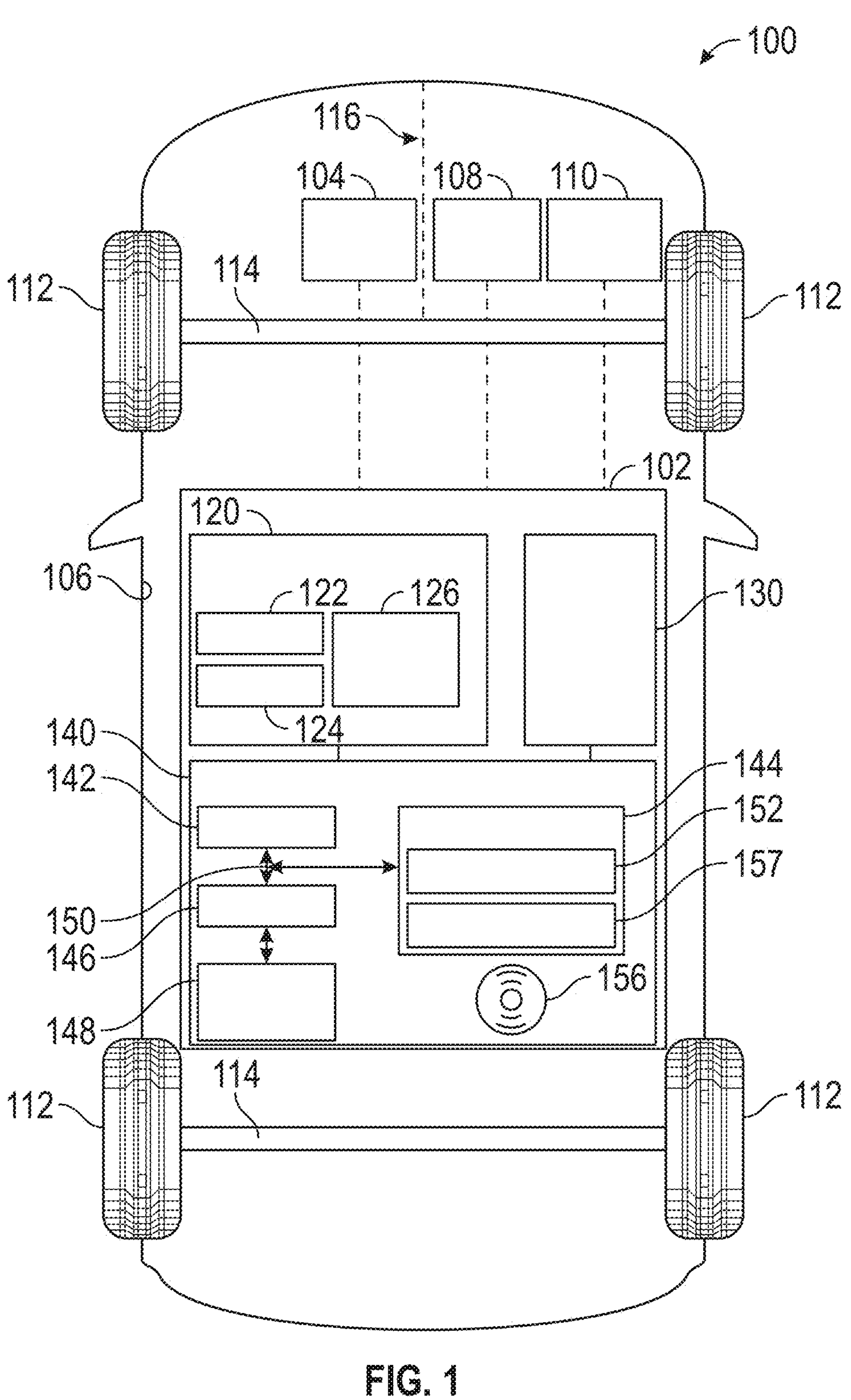
FIG. 1 is a functional block diagram of a vehicle that includes a steering system and a control system for determining steering conditions, including stuck and rack failure conditions, in accordance with exemplary embodiments.

FIG. 1 illustrates a vehicle 100, according to an exemplary embodiment. As described in greater detail further below, the vehicle 100 includes a steering system 104 and a control system 102 configured for determining conditions pertaining to the steering system 104, including as to a stuck rack condition and a failed rack condition for the steering system 104, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 106 that is arranged on a chassis 116. The body 106 substantially encloses other components of the vehicle 100. The body 106 and the chassis 116 may jointly form a frame. The vehicle 100 also includes a plurality of wheels 112. The wheels 112 are each rotationally coupled to the chassis 116 near a respective corner of the body 106 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used.

As depicted in FIG. 1, the vehicle 100 also includes a braking system 108 in various embodiments. In exemplary embodiments, the braking system 108 controls braking of the vehicle 100 using braking components that are controlled via inputs provided by a driver (e.g., via a braking pedal in certain embodiments) and/or automatically via the control system 102.

As referenced above, the vehicle 100 also includes a steering system 104. In various embodiments, the steering system 104 comprises a steer-by-wire steering system, in which there is no physical connection between a steering wheel and the road wheels 112 in a stable environment.

Figure 2:
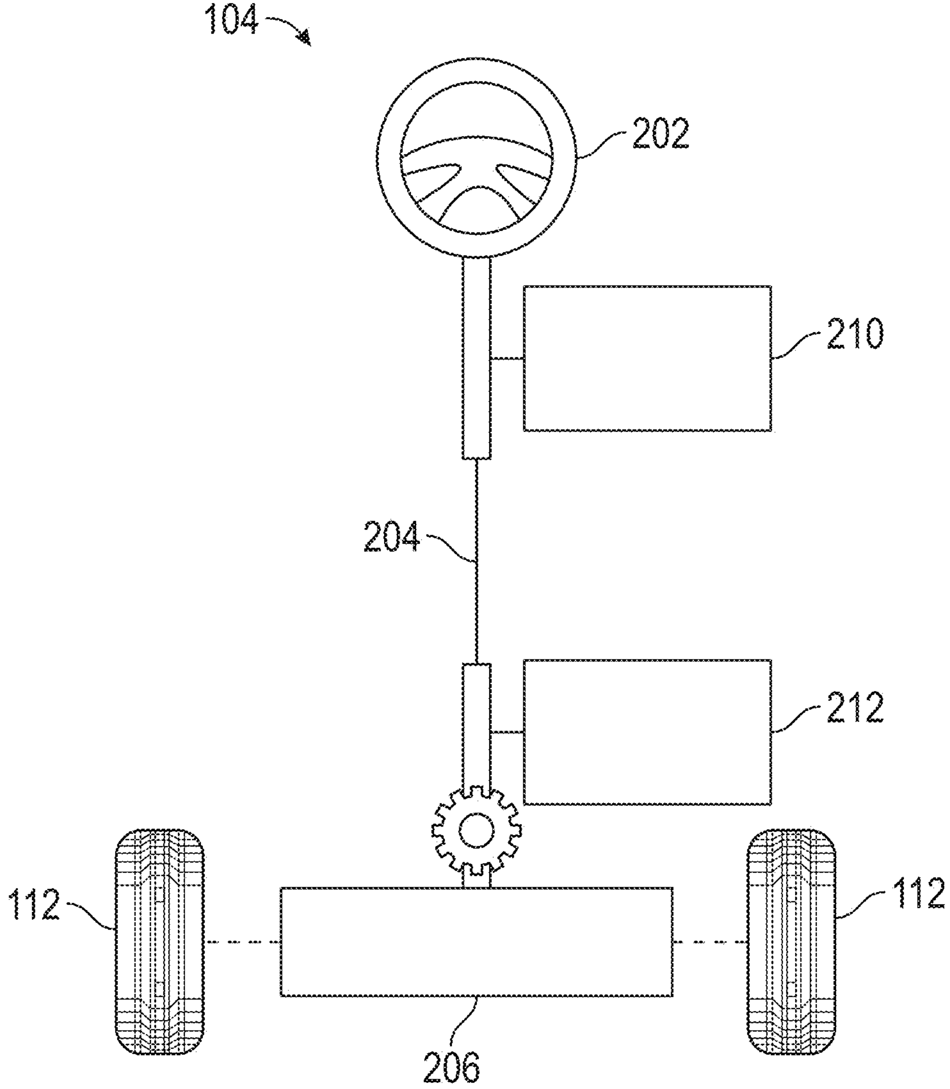
FIG. 2 is a functional diagram of a steer-by-wire steering system of the vehicle of FIG. 1, in accordance with exemplary embodiments.

With reference to FIG. 2, an illustration is provided of the steering system 104 in accordance with an exemplary embodiment. As depicted in FIG. 2, in an exemplary embodiment, the steering system 104 (i.e., a steer-by-wire system) includes, among other features, a steering wheel 202, a pinion 204, a rack 206, an actuator 208, a first motor 210, and a second motor 212. In an exemplary embodiment, the rack 206 is disposed on one of the axles 114 of FIG. 1, and connects to one or more of the wheels 112 of the vehicle 100. In various embodiments, the steering system 104 may include multiple racks 206 for multiple axles 114 and/or for multiple wheels 112, and so on. Also in an exemplary embodiment, the first motor 210 is coupled to and/or in proximity to the steering wheel 202 (e.g., as a feedback motor for the steering wheel 202). Also in an exemplary embodiment, the second motor 212 comprises a road wheel actuator (RWA) motor that is coupled to and/or in proximity to one or more of the road wheels 112 (e.g., for controlling movement of one or more of the wheels 112).

With reference back to FIG. 1, in various embodiments the control system 102 is coupled to the steering system 104, and determines conditions pertaining to the steering system 104. In certain embodiments, the control system 102 further controls steering in certain situations (e.g., via automatic steering). In addition, in certain embodiments, the control system 102 may also be coupled to one or more other vehicle components, such as the drive system 110, braking system 108, and so on, and may control operation thereof in whole or in part.

As depicted in FIG. 1, in various embodiments, the control system 102 includes a sensor array 120, a display 130, and a controller 140, as described in greater detail below.

In various embodiments, the sensor array 120 includes various sensors that obtain sensor data for use in determining conditions of the vehicle 100 pertaining to the steering system 104, including a vehicle stuck condition (e.g., as caused by an object or other obstruction in proximity to one or more of the wheels 112) and a steering system 104 failure condition (e.g., a condition of or pertaining to the rack 206 of FIG. 2). In various embodiments, the sensor array 120 includes one or more steering sensors 122 and cameras 124, as described below. Also in certain embodiments, the sensor array 120 may also include one or more other sensors 126.

In various embodiments, the steering sensors 122 include sensors of or pertaining to the steering system 104, and obtain sensor data pertaining to the steering system 104. In various embodiments, the steering sensors 122 obtain sensor data for an electric current of one or both of the motors 210, 212 of the steering system 104 and/or that are used to calculate and estimated value for the electric current. In various embodiments, the sensor data values include measured or estimated values as to electric current, voltage, pinion angle, motor angle (of one or both of the motors 212, 212), and rack force, among other possible values pertaining to the steering system 104.

Also in various embodiments, the cameras 124 detect camera images of a region outside the vehicle 100 (e.g., in proximity to the wheels 112 thereof). Also in various embodiments, the cameras 124 detect objects and/or other impediments to movement of the vehicle 100 and/or the wheels 112 thereof (e.g., pertaining to a stuck vehicle state).

In various embodiments, the sensor array 120 may further include one or more other sensors 126, which may include, by way of example, additional sensors pertaining to operation of the vehicle 100 (e.g., heading, velocity, acceleration, and so on) and/or additional sensors for detection objections and obstructions (e.g., radar, sonar, Lidar, and so on).

In various embodiments, the display 130 provides information for a driver and/or other user of the vehicle 100, including with respect to determinations made by the control system 102. In various embodiments, the display 130 provides information as to the determinations by the control system 102 as to one or more conditions of or pertaining to the vehicle 100 and the steering system 104 thereof (e.g., a stuck condition or a rack failure condition, among other possible conditions). In addition, in various embodiments, the display 130 further provides instructions for the driver to follow in view of and to help remedy the conditions (such as by seeking service at a service center if a rack failure is present, and/or turning the steering wheel to help the wheels 112 and the vehicle 100 move around an obstruction if a vehicle stuck condition is present, and so on). In various embodiments, the display 130 comprises a system that includes a display screen for visual depiction of this information and instructions for the user, in accordance with instructions provided thereto by the control system 102. In certain embodiments, the display 130 may also include one or more audio, haptic, and/or other components.

In various embodiments, the controller 140 is coupled to the sensor array 120 and to the display 130 and the steering system 104. In various embodiments, the controller 140 may also be coupled to one or more other vehicle systems, as noted above. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls the display 130, including the information and instructions provided on the display 130 for the driver or other user of the vehicle 100. In various embodiments, the controller 140 provides these and other functions in accordance with the steps of the process 300 of FIG. 3 and the implementations of FIGS. 4-11.

In various embodiments, the controller 140 (and, in certain embodiments, the control system 102 itself) is disposed within the body 106 of the vehicle 100. In one embodiment, the control system 102 is mounted on the chassis 116. In certain embodiments, the controller 140 and/or control system 102 and/or one or more components thereof may be disposed outside the body 106, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 300 of FIG. 3 and the implementations of FIGS. 4-11.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with stored values 157 (e.g., threshold values for the process 300 in various embodiments).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 300 discussed further below in connection with FIG. 3 and the implementations of FIGS. 4-11. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 3:
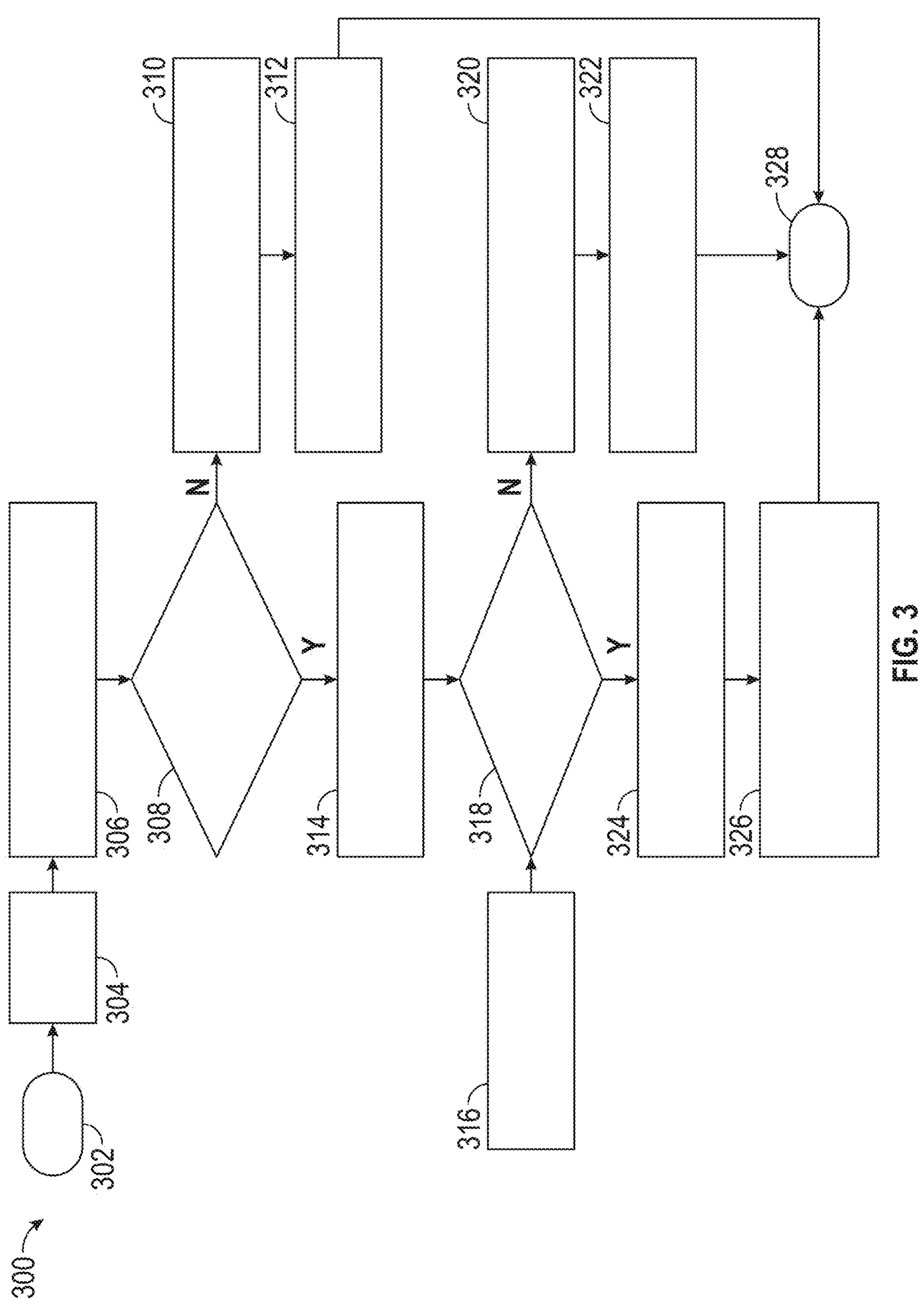
FIG. 3 is a flowchart of a process for determining steering conditions, including stuck and rack failure conditions, of a vehicle, and that can be implemented in connection with the vehicle of FIG. 1 and the steering system of FIGS. 1 and 2 in accordance with exemplary embodiments.

FIG. 3 is a flowchart of a process 300 for determining steering conditions, including stuck rack and failed rack conditions, of a vehicle in accordance with exemplary embodiments. Also in various embodiments, the process 300 can be implemented in connection with the vehicle 100 of FIG. 1, including the steering system 104 and the control system 102 of FIGS. 1 and 2. The process 300 is described below in connection with the flowchart as presented in FIG. 3 as well as the implementations that are depicted in FIGS. 4-11 and that are described in greater detail further below in connection therewith.

As depicted in FIG. 3, in various embodiments, the process 300 begins at step 302. In one embodiment, the process 300 begins when a vehicle drive or ignition cycle begins, for example when a driver enters the vehicle for operation of the vehicle. In one embodiment, the steps of the process 300 are performed continuously during operation of the vehicle.

In various embodiments, sensor data is collected (step 304). In various embodiments, sensor data is collected from the sensor array 120 of FIG. 1, including steering sensor data from the steering sensors 122 and camera data from the cameras 124.

Figure 4:
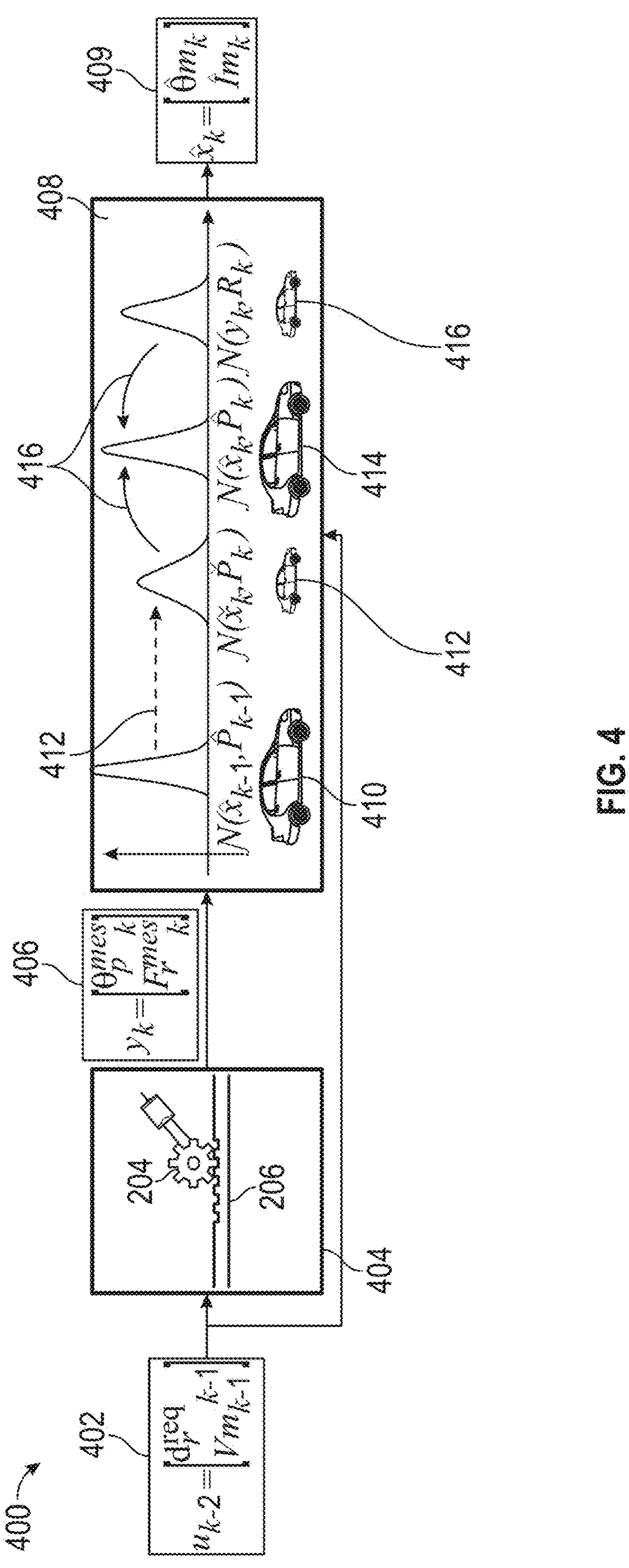
FIGS. 4 and 5 depict exemplary implementations of the process of FIG. 3, including implementations of an RWA system observer and a Kalman filter used therein, in accordance with exemplary embodiments.
Figure 5:
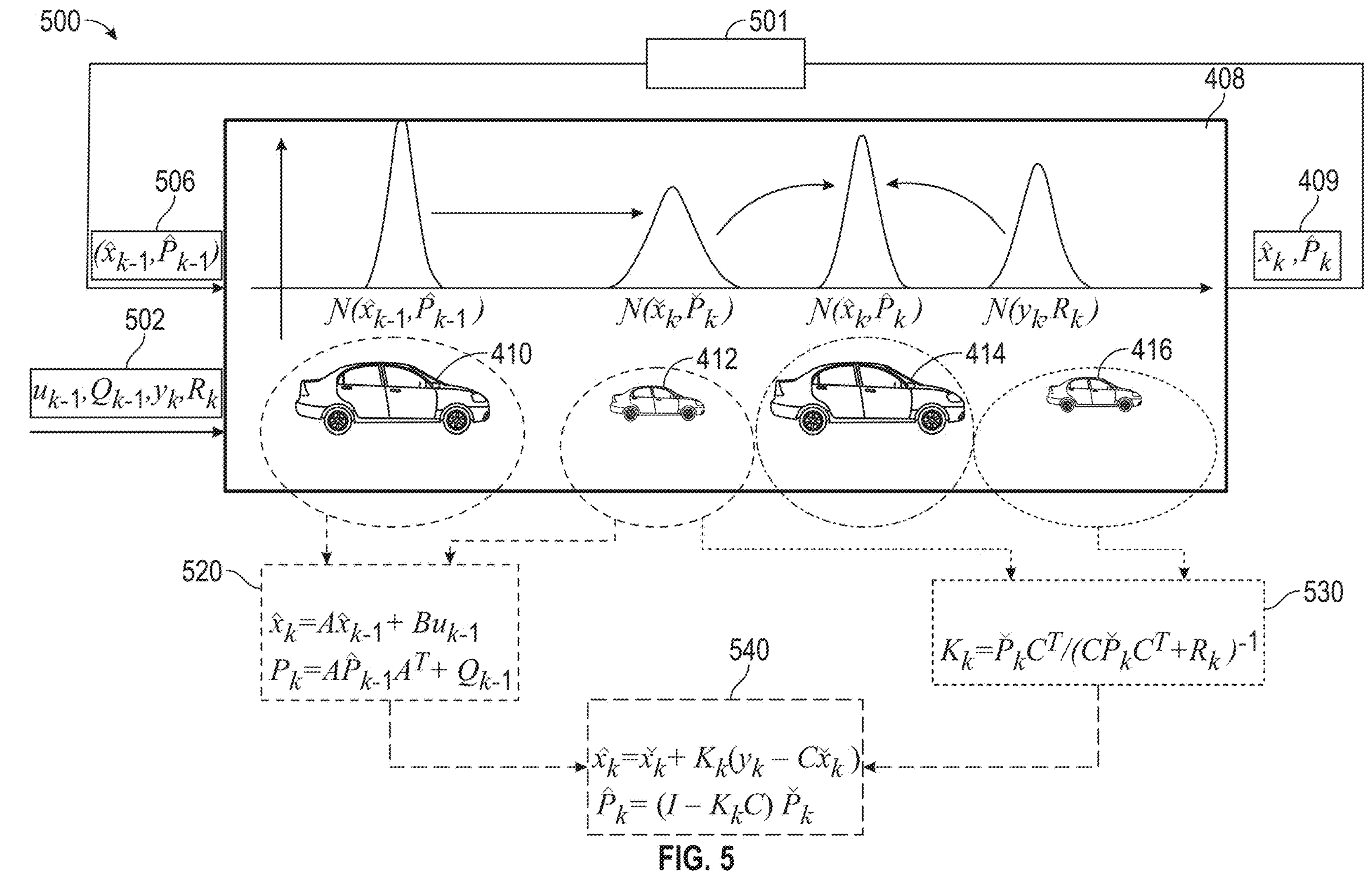

In various embodiments, an estimation is made as to motor current (step 306). Specifically, in various embodiments, an estimation is performed by the processor 142 of FIG. 1 as to an electric current of the second motor 212 of FIG. 2 (i.e., a road wheel actuator motor) as the vehicle 100 is operating. In accordance with an exemplary embodiment, the estimation of the motor current of step 306 is performed by the processor 142 using an observer to estimate a road wheel actuator (RWA) motor angle and current by integrating a prediction model for the RWA system and a measurement model for observations, along with use of a Kalman filter, as depicted in FIGS. 4 and 5 and as described in greater detail further below in connection therewith.

With continued reference to FIG. 3, in various embodiments a determination is made as to whether the estimated motor current of step 306 (i.e., of the second motor 212 of FIG. 2) is greater than or equal to a predetermined motor current threshold (step 308). In various embodiments, this determination is made by the processor 142 of FIG. 1 using one or more predetermined thresholds that are stored in the memory 144 of FIG. 1 as stored values 157 thereof.

In various embodiments, if it is determined during step 308 that the estimated motor current is less than the predetermined threshold, then a determination is made that the rack status is operational (step 310). In various embodiments, this determination is made by the processor 142, and indicates that the steering rack is operating without failure and that there is no impediment for movement of the wheels 112. In various embodiments, the process 300 then proceeds to step 312, in which a first scenario is attained, and no alert is provided to the driver.

Conversely, in various embodiments, if it is instead determined during step 308 that the estimated motor current is greater than or equal to the predetermined threshold, then a determination is made that the rack status is facing a condition of either (a) a failed condition or (b) a stuck condition (step 314). In various embodiments, this determination is made by the processor 142.

Also in various embodiments, camera information is obtained (step 316). In various embodiments, camera data is obtained from one or more cameras 124 of FIG. 1, including as to a roadway and surrounding area in proximity to one or more of the wheels 112 of the vehicle 100.

In various embodiments, a determination is made as to whether an external object or impediment is present (step 318). In various embodiments, during step 318, the processor 142 determines whether the camera data of step 316 has detected any external objects or other impediments outside the vehicle 100 that may impede movement of the vehicle 100 and one or more wheels 112 thereof.

In various embodiments, if it is determined during step 318 that no external object is detected that would interfere with the movement of the vehicle 100 and wheels 112, then it is determined in step 320 that the rack status is a failure condition (step 320). In various embodiments, this determination is made by the processor 142, and indicates that the steering system 104 has an operational failure pertaining to the rack 206 of FIG. 2, pertaining to an internal mechanical failure of the rack 206 and/or elsewhere within the steering system 104. In various embodiments, the process 300 then proceeds to step 322, in which a rack failure condition is attained, and an alert is provided to the driver as to the mechanical failure. By way of example, such a mechanical failure may include an interlocked pinion, among other possible mechanical failures.

In various embodiments, during step 322, the alert is provided as a notification via the display 130 of FIG. 1 in accordance with instructions provided thereto by the processor 142. In various embodiments, the notification of step

322 comprises an instruction for the driver to seek service to repair the mechanical failure (e.g., at a service station). In various embodiments the notification is provided as a visual notification on a display screen of the display 130. In certain embodiments, a similar notification may be provided as an audible instruction (e.g., via a speaker of the display 130), and/or a message may be made to the driver via a computer and/or personal electronics device, and so on. In certain embodiments, the processor 142 may also automatically take a control action with respect to the service, such as by setting an appointment with a service station, or the like. Also in various embodiments, the process 300 then terminates at step 328.

Figures 6, 7:
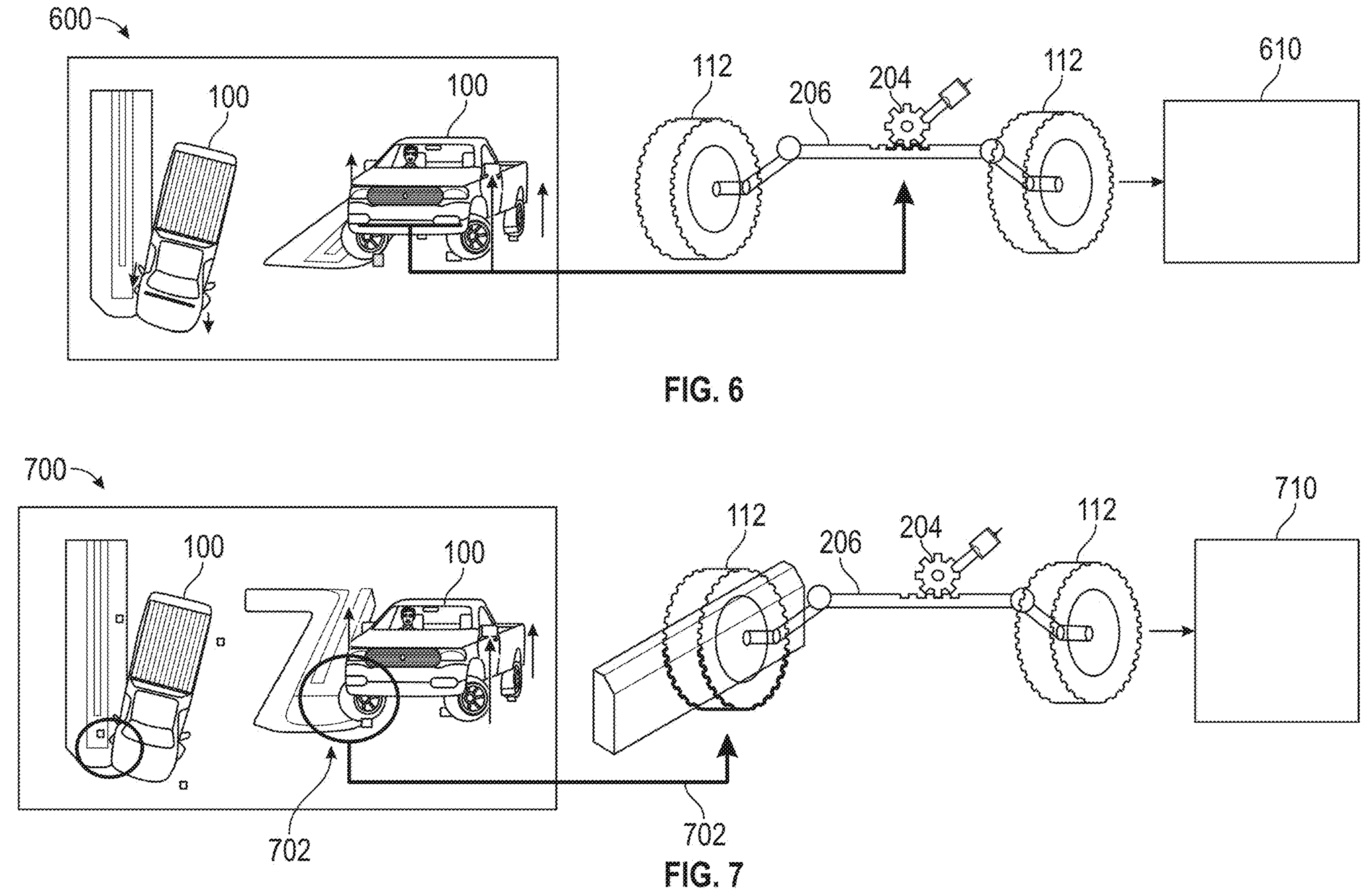
FIGS. 6 and 7 depict exemplary implementations of determinations of the process of FIG. 3, including a rack failure condition (e.g., in which a curbside has no height and does not cause any obstruction, as shown in FIG. 6), and a rack stuck condition (e.g., in which the curbside has a height and causes an obstruction, as shown in FIG. 7), respectfully.

With reference to FIG. 6, an illustration 600 is provided of the rack failure condition of step 322, in accordance with an exemplary embodiment. As depicted in FIG. 6, under this rack failure condition of steps 320-322, there are no external objects blocking movement of the wheels 112 and the vehicle 100, but instead there is a mechanical failure of the rack 206 of the steering system 104. In an exemplary embodiment, the illustration 600 of FIG. 6 includes a curbside that has no height and does not cause any obstruction. In this example, a notification 610 is provided for the driver to take a required service action to correct the internal mechanical failure (e.g. to take the vehicle 100 to a service station for repair).

With reference back to FIG. 3, in various embodiments if it is instead determined during step 318 that an external object is detected that would interfere with the movement of the vehicle 100 and wheels 112, then it is determined in step 324 that the rack status is a stuck condition due to an external object (step 324). In various embodiments, this determination is made by the processor 142, and indicates that the steering system 104 is performing correctly, but that an external object is impeding movement of the vehicle 100 and its wheels 112. By way of example, such an external object may include any number of different types of external objects, including a curb, pothole, rock, tree, railroad track, snow accumulation, uneven road surface, and so on. In various embodiments, the process 300 then proceeds to step 326, in which a stuck rack scenario is attained, and an alert is provided to the driver as to the external object. In various embodiments, the alert is provided as a notification via the display 130 of FIG. 1 in accordance with instructions provided thereto by the processor 142.

In various embodiments, the notification of step 326 comprises an instruction for the driver to take corrective steering action to steer the wheel 112 and vehicle 100 around the object. In various embodiments the notification is provided as a visual notification on a display screen of the display 130. In certain embodiments, a similar notification may be provided as an audible instruction (e.g., via a speaker of the display 130), and/or a message may be made to the driver via a computer and/or personal electronics device, and so on. In certain embodiments, the processor 142 may also automatically take a control action with respect to the corrective steering action, such as by automatically commanding the steering system 104 to take the corrective steering action (e.g., in the case of an autonomous or semi-autonomous vehicle). Also in various embodiments, the process 300 then terminates at step 328.

With reference to FIG. 7, an illustration 700 is provided of the rack stuck condition of step 326, in accordance with an exemplary embodiment. As depicted in FIG. 7, under this rack stuck condition of steps 324-326, there is an external object 702 blocking movement of the wheels 112 and the vehicle 100. In an exemplary embodiment, the illustration 700 of FIG. 7 includes a curbside that has a height and that causes an obstruction. In this example, a notification 710 is provided for the driver to take a corrective steering action to steer around or away from the external object.

Figures 8, 9, 10:
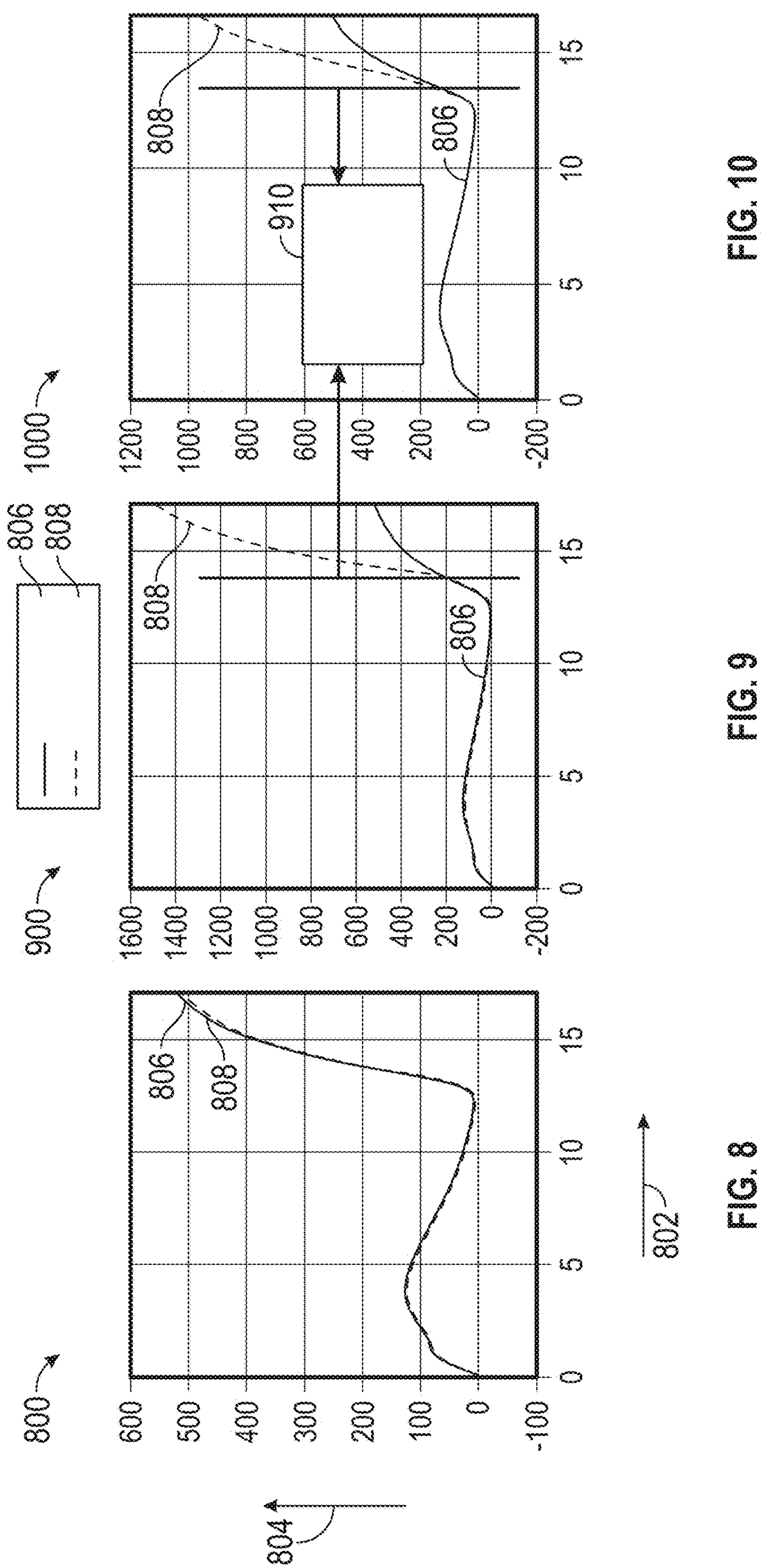
FIGS. 8-10 depict data diagrams of respective implementations, including a healthy scenario (FIG. 8), a rack failure condition corresponding to a condition of FIG. 6 (FIG. 9), and a rack stuck condition corresponding to a condition of FIG. 7 (FIG. 10)

With reference to FIGS. 8-10, respective illustrations 800, 900, and 1000 are provided with respect to different conditions of the process 300. Specifically, each of FIGS. 8-10 depict representations of time 802 (in seconds) along the x-axis, as compared with current 804 (in amps) along the y-axis. In each of these illustrations, actual current 806 is compared with observed current 808 for the motor (i.e., the second motor 212 of FIG. 2).

FIGS. 8-10 depict this information (described above) during three different conditions associated with the process 300 of FIG. 3. Specifically: (i) FIG. 8 depicts an operational condition in which there are no mechanical failures or obstructive objects (i.e., corresponding to steps 310-312 of FIG. 3); (ii) FIG. 9 depicts a failed rack condition in which a mechanical failure is present in the rack 206 (i.e., corresponding to steps 320-322 of FIG. 3); and (iii) FIG. 10 depicts a rack stuck condition in which an external object is blocking movement of the wheels 112 and vehicle 100 (i.e., corresponding to steps 324-326 of FIG. 3). Specifically, in various embodiments: FIG. 8 depicts an implementation of a healthy scenario; whereas FIG. 9 depicts an implementation of a rack failure condition corresponding to a condition of FIG. 6; and FIG. 10 depicts an implementation of a rack stuck condition corresponding to a condition of FIG. 7.

As shown in FIGS. 8-10, the actual current 806 and the observed current 808 are nearly identical in the operational condition of FIG. 8, but diverge in the failed rack condition of FIG. 9 and the rack stuck condition of FIG. 10.

As noted above, FIGS. 4 and 5 depict illustrations 400 and 500, respectively, with respect to the estimation of the motor current in step 306 of FIG. 3 in accordance with exemplary embodiments. Also as noted above, in accordance with an exemplary embodiment, the estimation of the motor current of step 306 is performed by the processor 142 using an observer to estimate a road wheel actuator (RWA) motor angle and current by integrating a prediction model for the RWA system and a measurement model for observations.

Also in an exemplary embodiment, as part of the prediction model, the RWA motor (i.e., the second motor 212 of FIG. 2, in an exemplary embodiment) is modeled as a direct current (DC) permanent magnet motor. In various embodiments, the processor 142 models the electrical properties of the motor as a series connection of a resistor, an inductor, and a voltage source that represents the back-EMF produced by the motor.

In various embodiments, the relationship at the motor terminals is represented in connection with the following equation:

$$L_m \dot{I}_m + R_m I_m + K_{emf} \dot{\theta}_m = V_m, \quad \text{(Equation 1)}$$

in which $\dot{I}_m$ and $\theta_m$ represent the RWA motor current and angle, respectively.

Additionally, in certain embodiments, the relationship between the hand wheel actuator (HWA) requested rack displacement and the RWA resulting road wheel angle is depicted in accordance with the following equation:

$$\dot{\theta}_m = -\frac{1}{\tau}\theta_m + \frac{K_{lump}}{\tau} d_r^{req}. \quad \text{(Equation 2)}$$

In various embodiments, this technique and the corresponding equation above accounts for the mechanical and dynamic characteristics that influence the transmission process from the HWA command to the RWA motor angle. Also in various embodiments, in order to represent the measurement model for observation, the processor 142 (for the purposes of the process 300) assumes that a centralized control unit (e.g., the control system 102, in an exemplary embodiment) receives pinion angle sensor measurements and rack force estimations from the actuator. In various embodiments, the RWA motor angle is assumed to be equal to the pinion angle sensor measurement. Also in various embodiments, the RWA motor current is determined by the processor 142 based on the rack force using a mathematical model that represents the interaction between the rack and pinion, along with an electrical model that represents the interaction between motor torque and current.

As depicted in FIG. 4, in an exemplary embodiment inputs 402 are provided to an RWA system 404 observer associated with the steering system 104, in order to generate outputs 406 from the RWA system 404 observer. In the depicted embodiment, the inputs 402 include a requested disk replacement ($d_r^{ag}$) motor voltage ($V_m$). Also in the depicted embodiment, the outputs 406 include a pinion angle (P) and rack force ($F_r$).

Also in various embodiments, as depicted in FIG. 4, the outputs 406 are used as inputs into a Kalman filter 408 that is used to generate outputs 409 that include estimated values of a motor current ($i_n$) along with a motor angle ($\theta_m$) for the second motor 212 of FIG. 2. Further, as depicted in FIG. 4, in various embodiments the Kalman filter 408 a first estimate 410 at a first time (k−1); an initial prediction 412 based on a motion model, a second estimate 414 at a second time (k); and one or more measurements 416 based on an observation model.

In various embodiments, the Kalman filter is employed that utilizes the following equations:

$$\theta_p^{mes} = \theta_m, \quad \text{(Equation 3)}$$

$$T_m^{mes} = K_{trq} I_m, \text{ and} \quad \text{(Equation 4)}$$

$$F_r^{mes} = T_m^{mes} / K_{mdl}, \quad \text{(Equation 5)}$$

in which $$F_r^{mes}$$

represents the rack force, $$T_m^{mes}$$

represents estimated motor torque, the θ values represent respective motor angles, I represents motor current, $K_{trg}$ represents the relationship between the motor current and torque, and $K_{mdl}$ represents the mathematical model of rack and pinion.

In various embodiments, the Kalman filter is also utilized for generating a state space form of the RWA model for representing Equations 1 and 2, namely utilizing the following equations:

$$\dot{x} = Ax + Bu + Q, \quad \text{(Equation 6)}$$

$$X = \begin{bmatrix} \theta_m \\ I_m \end{bmatrix}, \quad \text{(Equation 7)}$$

$$u = \begin{bmatrix} d_r^{req} \\ V_m \end{bmatrix}, \quad \text{(Equation 8)}$$

$$A = \begin{bmatrix} -\frac{1}{\tau} & 0 \\ \frac{K_{emf}}{\tau L_m} & -\frac{R_m}{L_m} \end{bmatrix}, \text{ and} \quad \text{(Equation 9)}$$

$$B = \begin{bmatrix} \frac{K_{lump}}{\tau} & 0 \\ -\frac{K_{emf} K_{lump}}{\tau L_m} & \frac{1}{L_m} \end{bmatrix}, \quad \text{(Equation 10)}$$

in which "Q" represents disturbances to the states, and in which the state form of the measurement model (i.e., corresponding to Equations 3, 4, and 5) are represented in accordance with the following equations:

$$y = Cx + R, \quad \text{(Equation 11)}$$

$$y = \begin{bmatrix} \theta_p^{mes} \\ F_r^{mes} \end{bmatrix}, \text{ and} \quad \text{(Equation 12)}$$

$$C = \begin{bmatrix} c_{p2m} & 0 \\ 0 & \frac{K_{trq}}{K_{mdl}} \end{bmatrix}. \quad \text{(Equation 13)}$$

In various embodiments, "R" represents measured noise, and "$C_{p2m}$" represents a conversion factor between the motor angle and pinion angle, such as in the following chart:

| Parameter | Value | Parameter | Value |
|---|---|---|---|
| $K_{emf}$ | 0.128 volt · s/rad | $K_{lump}$ | 200 rad/m |
| τ | 0.01 s | $R_m$ | 0.55 Ohms |
| $L_m$ | 1 mH | $c_{p2m}$ | 1 |

With reference to FIG. 5, in various embodiments a time delay 501 is introduced into the Kalman filter 408. As inputs 502 and 506 are provided to the Kalman filter 408 after the time delay, in various embodiments an updated prediction 520 is made based on both the first estimate 410 and the initial prediction 412 from FIG. 4 in accordance with the following equations:

$$\check{x}_k = A\hat{x}_{k-1} + Bu_{k-1}, \text{ and} \quad \text{(Equation 13)}$$

$$\check{P}_k = A\hat{P}_{k-1}A^T + Q_{k-1}, \quad \text{(Equation 14)}$$

In addition, with reference to FIG. 5, in various embodiments an optimal gain 530 is calculated based on the initial prediction 412 of FIG. 4 as well as the measurements 416 of FIG. 4, in accordance with the following equation:

$$K_k = \frac{\check{P}_k C^T}{\left(C\check{P}_k C^T + R_k\right)^{-1}}. \quad \text{(Equation 16)}$$

Finally, in various embodiments, with further reference to FIG. 5, a correction 540 is calculated based on both the updated prediction 520 of FIG. 5 as well as the optimal gain 530 of FIG. 5, in accordance with the following equations:

$$\hat{x}_k = \check{x}_k + K_k(y_k - C\check{x}_k); \text{ and} \quad \text{(Equation 17)}$$

$$\hat{P}_k = (I - K_k C)\check{P}_k. \quad \text{(Equation 18)}$$

Figure 11:
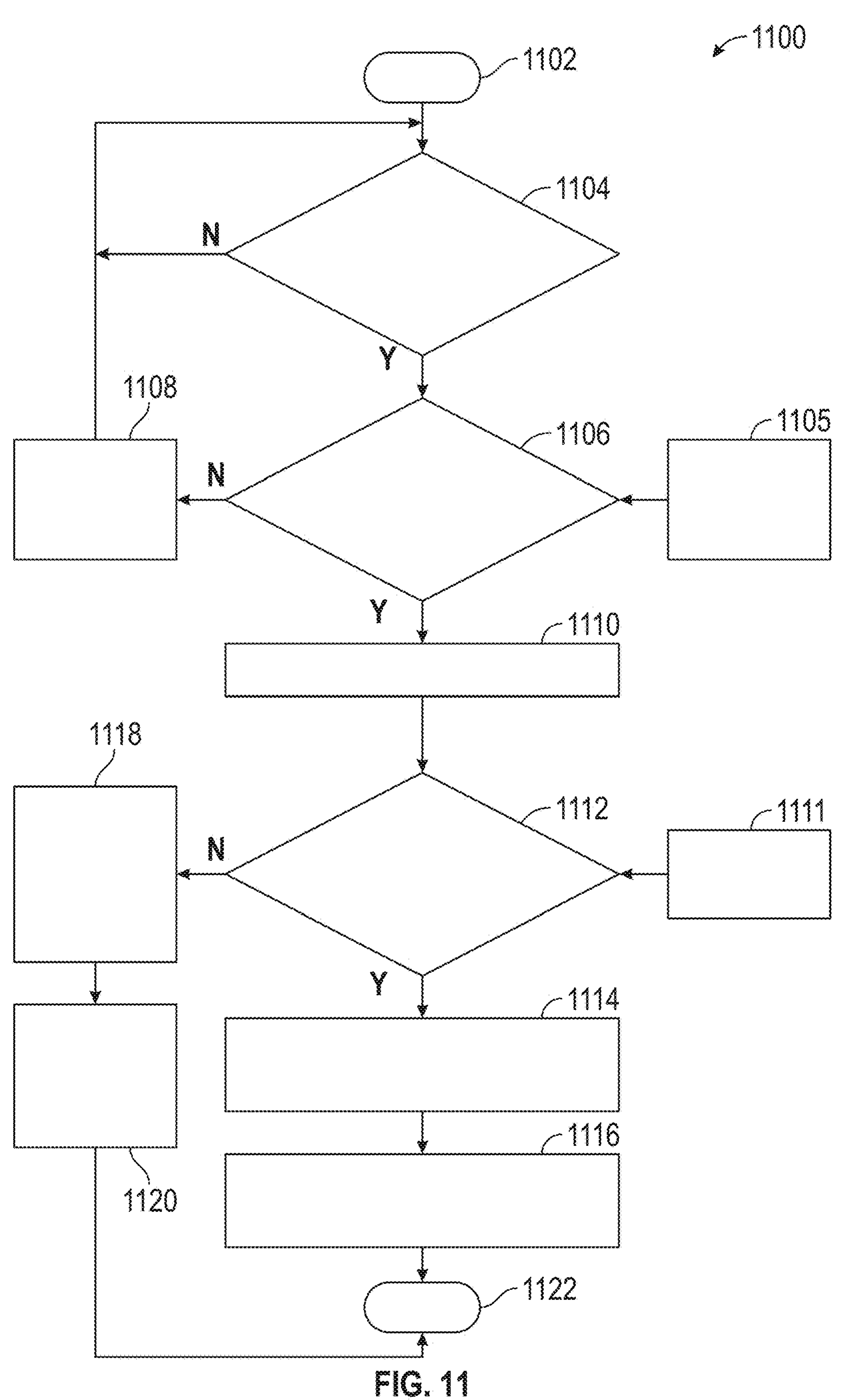
FIG. 11 depicts a further exemplary implementation for using the techniques described herein, in accordance with an exemplary embodiment.

FIG. 11 depicts of a flowchart illustrating a further exemplary implementation 1100 for using the techniques described herein, in accordance with an exemplary embodiment. The exemplary implementation is described in connection with the Paragraphs as well as in connection with the Block Diagram Guide provided further below.

As depicted in FIG. 11, in an exemplary embodiment, the implementation 1100 begins at 1102, after which a determination is made at step 1104 as to whether a current different ($I-I_{max}$) is greater than or equal to a threshold ($Trsh_{stk}$) for a certain amount of times recently, i.e., for $x_{stk}$ out of $y_{stk}$ and the last $z_{stk}$ times in certain embodiments.

If the determination of step 1104 is "yes", then data from the RWA diagnostics module is obtained at 1105, and is utilized at 1106 in determining whether the following conditions are correct:

| |
|---|
| (1) $V_m > Trsh_{vm};$<br>(2) $\lvert V_m - R_m I_m \rvert < Trsh_{err}$; and<br>(3) the RWA motor is healthy. |

In various embodiments, if one or more determinations of step 1106 are "no", then the process proceeds to 1108, in which a determination is made that one or more non-rack related failures are present (such as, in various embodiments, a short circuit, motor shaft misalignment, thermal overload, or the like). In various embodiments, the implementation 1100 then returns to 1104 in a new iteration.

Conversely, in various embodiments, if each of the determinations of step 1106 are "yes", then the process proceeds instead to 1110, in which a determination is instead made that the rack is either in a stuck condition or in a failed condition. In various embodiments, the implementation 1100 then proceeds to 1111 and 1112, described below.

In various embodiments, camera module data is obtained at 1111, and a determination is made during 1112 as to whether one or more cameras have detected an external object. Specifically, in certain embodiments, a determination is made as to whether one or more cameras (such as a front camera, a side camera, or both) has detected the presence of an external object (such as a curbside, pothole, rock, railroad tracks, snow accumulation, uneven pavement, or the like) that could interfere with the rack.

In various embodiments, if the determination of 1112 is "yes", then it is determined at 1114 that the rack is stuck due to an external object. In various embodiments, an alert is then provided at 1116 for the driver to take corrective steering action. In various embodiments, the implementation 1100 then terminates at 1122.

Conversely, in various embodiments, if the determination of 1112 is "no", then it is determined at 1118 that the rack has failed due to an internal mechanical failure. In various embodiments, an alert is then provided at 1120 for the driver to arrange for a service action (e.g., taking the vehicle 100 in to a service center). In various embodiments, the implementation 1100 then terminates at 1122.

As noted above, the implementation 1100 of FIG. 11 (and also in certain embodiments other implementations such as those described above) may also be considered with respect to the following Block Diagram Guide, in accordance with an exemplary embodiment:

Block Diagram Guide:

I: The RWA motor current estimated by the methods disclosed herein.

$I_{max}$: The maximum current that the RWA motor can produce.

$Trsh_{stk}$: The threshold representing the required difference between I and Imax to identify a stuck situation.

$X_{stk}$, $Y_{stk}$, and $Z_{stk}$: $Y_{stk}$ is the entire dataset in a specific data window; $X_{stk}$ is a subset of $Y_{stk}$; and $Z_{stk}$ is the last data points of $Y_{stk}$.

$Trsh_{vm}$ and $Trsh_{err}$: To ensure that high motor current is not the result of low voltage which may lead to high current to maintain the output torque.

$$F_r^{RWA}:$$

Rack force calculated by RWA sensory data measurement including I.

$$F_r^{IMU}:$$

Rack force calculated by IMU sensory data measurement including tire forces.

$Trsh_F$: The threshold representing the required difference between $$F_r^{RWA} \text{ and } F_r^{IMU}$$

to identify an internal stuck situation.

$X_F$, $Y_F$, and $Z_F$: $Y_F$ is the entire dataset in a specific data window; $X_F$ is a subset of $Y_F$; and $Z_F$ is the last data points of $Y_F$.

The values $Trsh_{stk}$, $X_{stk}$, $Y_{stk}$, $Y_{stk}$, $Trsh_{vm}$, and $Trsh_{err}$ are calibratable parameters.

Accordingly, methods, systems, and vehicles are provided for determining conditions pertaining to a steering system of a vehicle. In exemplary embodiments, steering sensor data and camera data are used in combination with an RWA system and Kalman filter for estimating a motor of a steer-by-wire system, and for determining whether the current condition corresponds to (i) an operational condition (i.e., in which the steering system is operating properly and there are no obstacles impeding movement); (ii) a rack failure condition (i.e., in which the steering system has a mechanical failure in the rack); or (iii) a rack stuck condition (i.e., which an external object is inhibiting movement of the wheel 112 and/or the vehicle 100). In various embodiments, appropriate action is taken based on the condition, including the providing of appropriate notices for a driver of the vehicle 100 (i.e., with instructions to take the vehicle 100 for service when there is a rack failure conditions, and with instructions to take corrective steering action around the object when there is a rack stuck condition).

It will be appreciated that the systems, vehicles, and methods may vary from those depicted in the Figures and described herein. For example, the vehicle 100 of FIG. 1, the control system 102 of FIG. 1, the steering system 104 of FIGS. 1 and 2, and/or components thereof may vary in different embodiments. It will similarly be appreciated that the steps of the process 300 may differ from that depicted in FIG. 3, and/or that various steps of the process 300 may occur concurrently and/or in a different order than that depicted in FIG. 3. It will similarly be appreciated that the implementations of FIGS. 4-11 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining, via one or more steering sensors of a vehicle, steering sensor data pertaining to a steering system of the vehicle, the steering system comprising a motor and a rack;

determining, via a processor of the vehicle, an estimated electric current of the motor based on the steering sensor data;

comparing, via the processor, the estimated electric current with a predetermined electric current threshold; and determining, via the processor, a condition of the steering system of the vehicle, including whether movement of the vehicle is inhibited and whether the rack has a failure, based on whether the estimated electric current is greater than or equal to the predetermined electric current threshold;

wherein the determining of the estimated electric current of the motor is performed by the processor using an observer to estimate an angle of a road wheel actuator (RWA) motor and current by integrating a prediction model for the RWA motor and a measurement model for observations, along with use of a Kalman filter; and wherein the determining of the estimated electric current of the motor is performed by the processor also by modeling the motor as a direct current (DC) permanent magnet motor, and by modeling electrical properties of the motor as a series connection of a resistor, an inductor, and a voltage source that represents back-EMF produced by the motor, and further including a relationship between a hand wheel actuator (HWA) requested rack displacement and a resulting RWA road wheel angle.

2. The method of claim 1, wherein:

the steering system comprises a steer-by-wire steering system having a feedback motor coupled to a steering wheel of the vehicle and a road wheel actuator (RWA) motor coupled to a road wheel of the vehicle; and the estimated electric current pertains to the RWA motor that is coupled to the road wheel of the vehicle.

3. The method of claim 1, further comprising:

taking a vehicle control action, in accordance with instructions provided by the processor, based on the condition that is determined via the processor.

4. The method of claim 1, further comprising:

providing a notification for a driver of the vehicle based on the condition, including instructions for an action for the driver to take to remedy the condition, via a display screen of the vehicle in accordance with the instructions provided thereto via the processor.

5. The method of claim 1, further comprising:

obtaining, via one or more cameras of the vehicle, camera data as to one or more external objects that are in proximity to the vehicle;

determining that the condition comprises an operational condition in which the steering system is operating correctly, when the estimated electric current is less than the predetermined electric current threshold;

determining that the condition comprises a rack failure condition in which a mechanical failure is present for the rack, when both of the following conditions are satisfied:

the estimated electric current is greater than or equal to the predetermined electric current threshold; and the camera data does not show any external objects that are deemed to be inhibiting movement of the vehicle; and determining that the condition comprises a rack stuck condition in which the rack is deemed to be stuck by the one or more external objects, when both of the following conditions are satisfied:

the estimated electric current is greater than or equal to the predetermined electric current threshold; and the camera shows an external object that is deemed to be inhibiting movement of the vehicle.

6. The method of claim 5, further comprising:

providing a service instruction for a driver of the vehicle, via instructions provide by the processor, to obtain repair of the steering system when the condition comprises the rack failure condition; and providing a steering action instruction for the driver of the vehicle, via the instructions provide by the processor, when the condition comprises the rack stuck condition.

7. The method of claim 1, wherein the determining of the estimated electric current of the motor is performed by the processor also by utilizing pinion angle sensor measurements and rack force estimations received from an actuator and determining the current based on the rack force using a mathematical model that represents an interaction between the rack and pinion, along with an electrical model that represents the interaction between motor torque and the current.

8. The method of claim 1, wherein the Kalman filter is utilized by the processor in estimating an angle of the motor along with the current of the motor utilizing a requested disk replacement ($d_r^{ag}$), a motor voltage ($V_m$), a pinion angle (P), and rack force ($F_r$), and utilizing multiple predictions of the current at different points in time and using a motion model as well as measurements of the current using an observation model, along with a time delay for the Kalman filter.

9. A system comprising:

one or more steering sensors of a vehicle configured to obtain steering sensor data pertaining to a steering system of the vehicle, the steering system comprising a motor and a rack; and a processor that is coupled to the one or more steering sensors and that is configured to at least facilitate:

determining an estimated electric current of the motor based on the steering sensor data;

comparing the estimated electric current with a predetermined electric current threshold; and determining a condition of the steering system of the vehicle, including whether movement of the vehicle is inhibited and whether the rack has a failure, based on whether the estimated electric current is greater than or equal to the predetermined electric current threshold;

wherein the processor is further configured to determine the estimated electric current of the motor by:

using an observer to estimate a motor angle for a road wheel actuator (RWA) motor and current by integrating a prediction model for the RWA motor and a measurement model for observations, along with use of a Kalman filter;

modeling the motor as a direct current (DC) permanent magnet motor, and by modeling electrical properties of the motor as a series connection of a resistor, an inductor, and a voltage source that represents back-EMF produced by the motor, and further including a relationship between a hand wheel actuator (HWA) requested rack displacement and a resulting RWA road wheel angle; and utilizing pinion angle sensor measurements and rack force estimations received from an actuator and determining the current based on the rack force using a mathematical model that represents an interaction between the rack and pinion, along with an electrical model that represents the interaction between motor torque and current.

10. The system of claim 9, wherein:

the steering system comprises a steer-by-wire steering system having a feedback motor coupled to a steering wheel of the vehicle and a road wheel actuator (RWA) motor coupled to a road wheel of the vehicle; and the estimated electric current pertains to the RWA motor that is coupled to the road wheel of the vehicle.

11. The system of claim 9, further comprising:

one or more cameras of the vehicle configured to obtain camera data as to one or more external objects that are in proximity to the vehicle;

wherein the processor is coupled to the one or more cameras and is further configured to at least facilitate:

determining that the condition comprises an operational condition in which the steering system is operating correctly, when the estimated electric current is less than the predetermined electric current threshold;

determining that the condition comprises a rack failure condition in which a mechanical failure is present for the rack, when both of the following conditions are satisfied:

the estimated electric current is greater than or equal to the predetermined electric current threshold; and the camera data does not show any external objects that are deemed to be inhibiting movement of the vehicle; and determining that the condition comprises a rack stuck condition in which the rack is deemed to be stuck by the one or more external objects, when both of the following conditions are satisfied:

the estimated electric current is greater than or equal to the predetermined electric current threshold; and the camera shows an external object that is deemed to be inhibiting movement of the vehicle.

12. The system of claim 11, wherein the processor is further configured to at least facilitate:

providing a service instruction for a driver of the vehicle, via instructions provide by the processor, to obtain repair of the steering system when the condition comprises the rack failure condition; and providing a steering action instruction for the driver of the vehicle, via the instructions provide by the processor, when the condition comprises the rack stuck condition.

13. The system of claim 11, wherein the processor is further configured to utilize the Kalman filter in estimating an angle of the motor along with the current of the motor utilizing a requested disk replacement ($d_r^{ag}$), a motor voltage ($V_m$), a pinion angle (P), and rack force ($F_r$), and utilizing multiple predictions of the current at different points in time and using a motion model as well as measurements of the current using an observation model, along with a time delay for the Kalman filter.

14. A vehicle comprising:

a steering system comprising a steer-by-wire steering system having a rack as well as a feedback motor coupled to a steering wheel of the vehicle and a road wheel actuator (RWA) motor coupled to a road wheel of the vehicle; and one or more steering sensors of the vehicle configured to obtain steering sensor data pertaining to the steering system of the vehicle;

one or more cameras of the vehicle configured to obtain camera data as to one or more external objects that are in proximity to the vehicle; and a processor that is coupled to the one or more steering sensors and to the one or more cameras and that is configured to at least facilitate:

determining an estimated electric current of the RWA motor based on the steering sensor data;

comparing the estimated electric current with a predetermined electric current threshold; and determining a condition of the steering system of the vehicle, including whether movement of the vehicle is inhibited and whether the rack has a failure, based on whether the estimated electric current is greater than or equal to the predetermined electric current threshold;

wherein the processor is coupled to the one or more cameras and is further configured to at least facilitate:

determining that the condition comprises an operational condition in which the steering system is operating correctly, when the estimated electric current is less than the predetermined electric current threshold;

determining that the condition comprises a rack failure condition in which a mechanical failure is present for the rack, when both of the following conditions are satisfied:

the estimated electric current is greater than or equal to the predetermined electric current threshold; and the camera data does not show any external objects that are deemed to be inhibiting movement of the vehicle; and determining that the condition comprises a rack stuck condition in which the rack is deemed to be stuck by the one or more external objects, when both of the following conditions are satisfied:

the estimated electric current is greater than or equal to the predetermined electric current threshold; and the camera shows an external object that is deemed to be inhibiting movement of the vehicle;

wherein the processor is further configured to at least facilitate:

providing a service instruction for a driver of the vehicle, via instructions provide by the processor, to obtain repair of the steering system when the condition comprises the rack failure condition; and providing a steering action instruction for the driver of the vehicle, via the instructions provide by the processor, when the condition comprises the rack stuck condition; and wherein the processor is further configured to determine the estimated electric current of the motor by:

using an observer to estimate a motor angle for the RWA motor and current by integrating a prediction model for the RWA motor and a measurement model for observations, along with use of a Kalman filter;

modeling the motor as a direct current (DC) permanent magnet motor, and by modeling electrical properties of the motor as a series connection of a resistor, an inductor, and a voltage source that represents back-EMF produced by the motor, and further including a relationship between a hand wheel actuator (HWA) requested rack displacement and a resulting RWA road wheel angle;

utilizing pinion angle sensor measurements and rack force estimations received from an actuator and determining the current based on the rack force using a mathematical model that represents an interaction between the rack and pinion, along with an electrical model that represents the interaction between motor torque and current; and utilizing the Kalman filter in estimating an angle of the motor along with the current of the motor utilizing a requested disk replacement ($d_r^{ag}$), a motor voltage ($V_m$), a pinion angle (P), and rack force ($F_r$), and utilizing multiple predictions of the current at different points in time and using a motion model as well as measurements of the current using an observation model, along with a time delay for the Kalman filter.

* * * * *